Jan. 26, 1965  R. B. GELENIUS  3,167,696
GAUGE CIRCUIT
Filed May 8, 1962

INVENTOR.
Robert B. Gelenius
BY
Paul J. Ethington
ATTORNEY

United States Patent Office 3,167,696
Patented Jan. 26, 1965

3,167,696
GAUGE CIRCUIT
Robert B. Gelenius, Flint, Mich., assignor to General Motors Corporation, Detroit, Mich., a corporation of Delaware
Filed May 8, 1962, Ser. No. 193,144
7 Claims. (Cl. 318—25)

This invention relates to electrical indicator gauges and more particularly to an improved electrical circuit for use with gauges of the type employing varying electromagnetic field principles.

The use of differentially energized electromagnetic deflecting coils to control the position of an indicator needle is commonly known in the art. Such a gauge circuit may employ a linear resistance sending unit having a grounded slidable contact, the position of which controls the relative current between the deflecting coils. The contact movement is controlled by the conditions at a remote point and may, for example, be obtained by means of a float, and thus, an indication is given of liquid level within a tank. The deflecting coils are rigidly located such that a permanent magnet armature may be rotatably mounted in a position which is influenced by the composite field from the two deflecting coils. The magnetized armature is then connected to an indicator needle, which may swing through an angle equal to the angle between the deflecting coils.

In particular applications it is often advantageous to increase the needle travel angle to greater than 180°. It can be seen that a circuit employing two deflecting coils is, in the absence of further biasing means, necessarily limited to a maximum angle of less than 180° since the resultant magnetic field must have a suitably strong component in all angular positions between the coil axes. A possible method of increasing the needle travel is to employ mechanical gearing between the magnetized armature and the indicator needle. However, such mechanical gearing necessarily requires an increase in power so as to increase the torque produced on the armature.

In accordance with the present invention, a novel gauge circuit is provided, which makes it possible to obtain a maximum angular needle travel of substantially greater than 180° without the use of gearing. This is generally accomplished through the controlled superimposition of variable magnetic fields and reference magnetic fields by which it is possible to reverse the direction of the resultant magnetic fields along a plurality of axes. In a particular embodiment of the invention, the means producing the reference fields are disposed with respect to a plurality of deflecting coils such that the reference magnetic fields are aligned with, but in opposition to, the magnetic fields produced by the deflecting coils.

Additionally, means are provided to control the magnitudes of the respective variable magnetic fields in a predetermined phase relation such that a progressively changing condition at a remote point causes a resultant magnetic field to be angularly displaced in a linear fashion through an angle of substantially greater than 180°. In general, this is accomplished through the provision of two resistive elements and a slidable member which contacts both of the resistors. Selected ends of the deflecting coils are connected to taps on respective resistors such that there exists two slidable contact positions where the magnetic field produced by a deflecting coil is exactly equal and opposite to the reference field. The slidable contact is positioned according to the conditions to be indicated, i.e., fuel level, and is of such a configuration that when it is in a position wherein the point of contact with one resistor is one of the aforementioned equalizing positions, the other resistor is contacted at the position where the deflecting coil is connected to that resistor.

These and other advantages of the invention will become apparent upon reading of the following specifications taken with the drawings of which:

Figure 1:
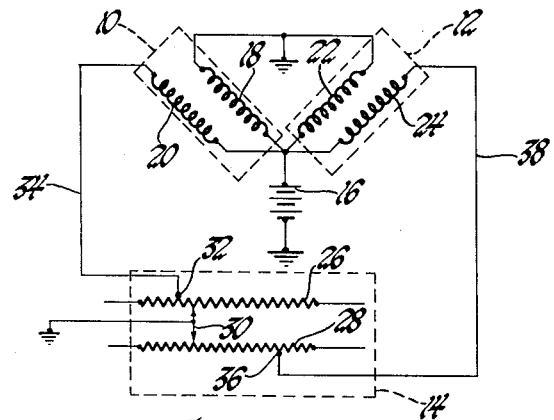
FIGURE 1 is a schematic circuit diagram illustrative of an embodiment of the present invention in an electrical gauge circuit to provide 270° of indicator needle travel.

Referring now to FIGURE 1, there is shown an electrical gauge circuit for providing an indicator needle movement of 270°. The gauge circuit comprises two mutually perpendicular pairs of windings 10 and 12. The current in the windings 10 and 12, and thus, the magnetic fields generated thereby, are controlled by a variable resistance sending unit 14, which is designed to effect the proper phasing of the magnetic fields. Energizing voltage for the winding current is provided by a source 16, having the positive terminal thereof connected to the windings 10 and 12, and the negative terminal connected to ground.

The winding 10 comprises a reference coil 18 and a control coil 20. Similarly, the winding 12 comprises a reference coil 22 and a control coil 24. The reference coils 18 and 22 are wound bifilar with the control coils 20 and 24 respectively, such that the magnetic fields produced by the reference coils 18 and 22 are opposite in direction to the magnetic fields produced by the control coils 20 and 24 respectively. Assuming that the source 16 of energizing voltage remains constant in value, it can be seen that inasmuch as the reference coils 18 and 22 are connected directly across the source 16, the magnetic fields produced thereby will be constant in value. It is apparent that the generation of the reference magnetic fields is not limited to the arrangement of FIGURE 1 but may be provided by any suitable magnetic or electromagnetic means.

The sending unit 14 comprises resistors 26 and 28 and a slidable contact 30, which is connected to ground as shown. The slidable contact 30 is adapted to contact both of the resistors 26 and 28 throughout their effective length. FIGURE 1 is not intended to indicate the physical nature of the resistors 26 and 28. Any suitable potentiometer arrangement may be used to provide the required resistance functions as will become more apparent in the following.

Each of the control coils 20 and 24 is connected on one side to the positive terminal of the source 16. The control coil 20 is connected to a tap 32 on the resistor 26 by way of a conductor 34. The control coil 24 is connected to a tap 36 on the resistor 28 by way of a conductor 38. Since the slidable contact 30 is effectively connected to the negative terminal of the source 16, it can be seen that displacement of the contact 30 about the taps 32 and 36 is effective to vary the respective resistances connected in series with the control coils 20 and 24 and the source 16. This series resistance value will be a minimum when the position of the slidable contact 30 corresponds to a tap position and will increase to either side thereof, according to a predetermined function of resistance versus displacement. Each of the taps 32 and 36 is located at a predetermined point on the respective resistors 26 and 28 corresponding to the difference in resistance between the reference and control coils as will be seen in the following.

In the circuit of FIGURE 1, each of the windings 10 and 12 has two coils and each of the coils 18, 20, 22 and 24 has the same number of turns. However, the D.C. resistance of the reference coils 18 and 22 is greater than that of the control coils 20 and 24 by a predetermined amount. For purposes of discussion, this predetermined amount is assigned a value of one unit of resistance. The taps 32 and 36 are so located on resistors 26 and 28, respectively, such that when the slidable contact 30 is in a position whereby resistor 26 is contacted immediately adjacent the tap 32, the amount of resistance coupled in series with the control coil 24 by resistor 28 is exactly equal to one unit of resistance. As previously stated, this corresponds to the difference in resistance between the reference and control coils 22 and 24 respectively. Similarly, when the slidable contact 30 is in a position whereby resistor 28 is contacted immediately adjacent the tap 36, the resistance connected in series with control coil 20 is exactly equal to the difference in resistance between the reference and control coils 18 and 20 respectively. Additionally, when the slidable contact 30 is in an extreme lefthand position of the sending unit 14, the portion of resistor 26 connected in series with the control coil 20 is again equal to one unit of resistance. A similar circumstance, with respect to coils 22 and 24, exists when the slidable contact 30 is at the extreme righthand position of the sending unit 14.

Varying the resistance connected in series with the control coils 20 and 24 and the source 16 will have the effect of varying the current through the coils. The magnetic fields produced by the control coils 20 and 24 will vary according to the changing ampere-turns relation. It has been stated that the magnetic fields produced by the reference coils 18 and 22 is constant since the ampere-turns value for these coils 18 and 22 is a constant. Thus, varying the current through the control coils 20 and 24 from values greater than the reference coil currents to values less than the reference coil currents will have the effect of reversing the direction of the resultant magnetic field in each of the windings 10 and 12.

Figure 2:
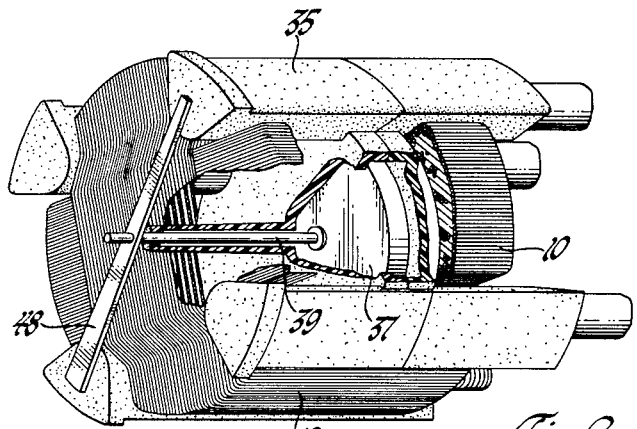
FIGURE 2 is a partly broken away isometric view of a preferred arrangement of the deflecting coils of FIGURE 1.

Referring to FIGURE 2, there is shown an arrangement of the bifilar windings 10 and 12 in an air cored gauge. The windings 10 and 12 are disposed on a gauge body 35 so as to be mutually perpendicular. Located centrally of the windings is a permanent magnet armature 37 in the form of a flat round disc which is diametrically magnetized. In this location, the armature 37 is within the joint influence of the fields produced by windings 10 and 12. The armature 37 is rotatably mounted by means of a shaft 39 extending through the center of the armature 37 and perpendicular thereto. Mounted on the external end of the shaft 39 is an indicator needle 48 whose angular disposition is indicative of the magnetic field relation within the windings 10 and 12.

Note that alternate layers of windings 10 and 12 are shown interlaced at the junction of the windings. This winding method insures the existence more uniform coil parameters and gauge response characteristics.

Each of the windings 10 and 12 is made up of a control and reference coil as previously specified. Thus, a winding may produce, according to the value of control coil current, a magnetic field in either direction along its axis. Accordingly, if the control and reference coil currents are equal, the magnetic fields, being in opposition, will cancel. By suitably phasing the control current variations as between the windings 10 and 12, the resultant field produced by the windings 10 and 12 may be made to vary in direction along a plane defined by the axes of the windings. The armature 37 aligns with the resultant field according to the known principle of magnetic attraction. Rotation of the armature 37 is indicated by a corresponding rotation of the needle 48.

The winding configuration of FIGURE 2 is given strictly by way of example and can be modified to suit any particular gauge structure, including iron core gauges as will be apparent to one skilled in the art. The present invention may be employed to indicate any number of remote conditions wherein a change in the remote condition affects the fields produced by the control coils 20 and 24 in a prescribed manner.

It is contemplated that the invention may be employed in an environment where the value of energy from source 16 is subject to fluctuations. One example is an automobile battery. By connecting both reference and control coils to the same source, it can be seen that no relative magnetic field fluctuation between the reference and control coils is produced by a fluctuation in the output of source 16. Since the system of FIGURE 1 is not responsive to absolute field strength values, but only relative field strength values, the accuracy of the gauge is not impaired by a fluctuating energizing voltage.

Figure 3:
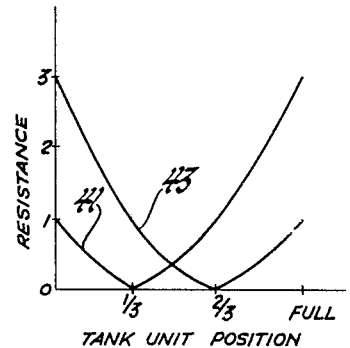
FIGURE 3 is a plot of resistance values against the position of the slidable contact member for the circuit of FIGURE 1.

The relation between the value of resistance connected in series with the control coils 20 and 24 and the position of the slidable contact 30, can be more clearly seen in FIGURE 3. The curves 41 and 43 are representative of the variations in the resistances connected in series with control coil 20 and 24 respectively. The zero position on the horizontal axis corresponds to an extreme lefthand position of the contact 30 within the sending unit 14. It can be seen that in this position the resistance connected in series with the control coil 20 is equal to one unit, and the resistance connected in series with control coil 24 is equal to three units. Three units is given only by way of illustration and can be any value greater than one which significantly limits the field producing amperes. According to the resistance function diagram of FIGURE 3, when the slidable contact 30 has advanced to the right in the sending unit 14 to a position immediately adjacent tap 32, the control coil 20 is connected directly across the source 16. At the same time, the resistance connected in series with the control coil 24 has decreased to one unit. If the slidable contact 30 continues to advance to the right until it contacts the tap 36, the control coil 24 is connected directly across the source 16 and the resistance connected in series with control coil 20 has increased to one unit again. At the righthand extreme of the sending unit 14, the resistance connected in series with the control coil 20 has increased to three units while the resistance connected in series with control coil 24 is equal to one unit. It should be noted again that one unit is equal in resistance to the difference between the resistance of the reference and control coils. It can be seen from the resistance functions of FIGURE 3 that the movement of the slidable contact 30 does not produce a linear change in the respective resistances connected in series with coils 20 and 24. However, it will be seen that the resistance functions do result in a linear indicator needle movement.

The resistance functions of FIGURE 3 may be generated by means of various means as will occur to a gauge artisan. For example, the resistors 26 and 28 may have a linear distribution of resistance along the lengths thereof while a non-linear system of levers actuated by the conditions to be measured moves the slidable contact 30 to the proper resistance points. Alternatively, the slidable contact 30 may be displaced directly by a linearly moving mechanism while the resistors 26 and 28 are wound with the resistances thereof distributed along their lengths according to the desired functions. It is also contemplated that a non-linear needle movement may be desired, in which case the functions of FIGURE 3 may be varied as suits the operator.

Figure 4:
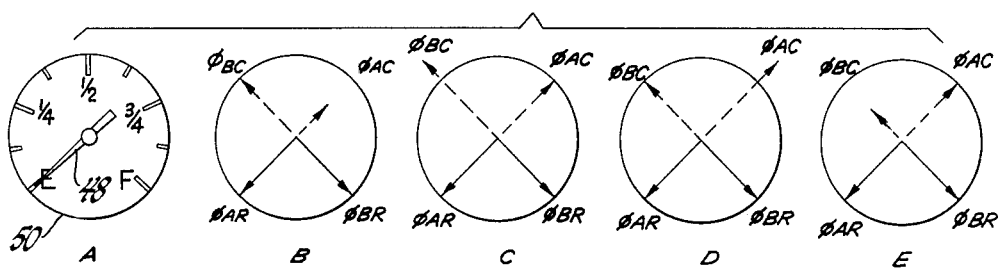
FIGURE 4 is a progressive vector chart illustrating the variations in magnetic fields which result in the circuit of FIGURE 1.

Considering now the operation of the gauge circuit in greater detail, reference may be taken to the vector diagrams of FIGURE 4. The magnetized armature 37 is directly connected to the indicator needle 48 shown in FIGURE 4A. In this description the position of the indicator needle 48 may be taken to indicate the level of liquid in a rectangular tank by means of a calibrated dial face 50.

Referring to FIGURES 4B, C, D and E, one may consider the dial face 50 of FIGURE 4A to be superimposed on each of these vector diagrams. The indicator needle 48 will be aligned with the resultant flux vector as determined by the following analysis.

Recalling that the reference coils 18 and 22 are connected across the source 16, it can be seen that the magnetic field generated thereby will be constant in value. Since the magnetic axes of the windings 10 and 12 are disposed at a 90° angle, the magnetic fields produced thereby are disposed at a relative angle of 90°. For purposes of illustration the magnetic flux vectors produced by the coils in winding 12 will be designated by the letter A, while the magnetic flux vectors generated by the coils of winding 10 will be designated by the letter B. Additionally, control coil flux vectors are designated by C, while reference coil flux vectors are designated by the letter R. It can be seen that the flux vectors AR and BR, generated by the reference coils 22 and 18 respectively, are constant in magnitude and direction throughout the vector diagrams of FIGURES 4B through E. However, the magnitudes of the flux vectors BC and AC, generated by the control coils 20 and 24 respectively, are altered in magnitude according to the current through the respective control coils. This current is controlled by the resistance connected in series with the respective control coils and the source 16 by means of the slidable contact 30.

With the slidable contact 30 in the extreme lefthand position within the sending unit 14, one unit of resistance is connected in series with the control coil 20. This one unit of resistance is equal to the difference in resistance between the reference coil 18 and the control coil 20. Thus, the currents through the coils 18 and 20 are equal and the magnetic fields produced thereby cancel. This is seen in FIGURE 4B as the flux vectors BR and BC are equal in magnitude and opposite in direction. However, three units of resistance are connected in series with control coil 24. Thus, the current through control coil 24 is substantially less than the current through the reference coil 22, and the flux vector AC is substantially smaller than that of AR. Therefore, the armature 37 will align the indicator needle 48 with the predominant vector AR. This corresponds to an indication of "Empty" on the dial face 50. As the actuating mechanism causes the slidable contact 30 to move to the position adjacent tap 32, reference to FIGURE 3 shows that no series resistance is connected with coil 20. One unit of resistance is connected in series with coil 24. Since this one unit is equal in resistance to the difference between the resistances of coils 22 and 24, equal and opposite magnetic fields will be produced by the control and reference coils 22 and 24 respectively. Therefore, as can be seen in FIGURE 4C, the flux vectors AR and AC cancel. With no resistance in series with control coil 20 of winding 10, the current through control coil 20 will be greater than that of reference coil 18. Thus, the vector BC is the predominant flux vector and indicator needle 48 will be aligned therewith. This position corresponds to a reading of one-third on the indicator face 50. At any point intermediate the two positions of contact 30 just described, there will exist a resultant flux vector having a direction dependent on the relative magnitudes of vectors AR and BC. The armature 37 will accordingly be aligned with this resultant vector.

Should the slidable contact 30 be positioned such that resistor 28 is contacted adjacent tap 36, there will be no resistance connected in series with control coil 24. Reference to FIGURE 3 indicates that one unit of resistance is connected in series with control coil 20, and thus, the flux vector BC and BR will cancel. Since the predominant flux vector is produced in the control coil 24, the indicator needle 48 will be aligned to indicate a reading of two-thirds.

Referring to FIGURE 4E, the slidable contact 30 is in the extreme righthand position within the sending unit 14. In this position, one unit of resistance is connected in series with control coil 24 and three units of resistance are connected in series with control coil 20. Since the currents through coils 22 and 24 are again equal and opposite, the resultant flux vector from winding 12 is zero. The predominant flux vector will be generated in the reference coil 18 of winding 10 and the indicator needle 48 will align with the flux vector BR. This corresponds to a reading of "Full" on the dial face 50.

It can be seen that the present invention as applied to the 90° four-coil unit of FIGURE 1 provides a maximum indicator needle travel angle of 270°. It will be apparent to those skilled in the art that the relative angle between windings 10 and 12 may be varied to regulate this angle as is desired.

While the invention has been described with reference to a particular embodiment thereof, it is to be understood that various modifications may be made to so alter the operating characteristics of the gauge employing the invention as suits the designer. For a definition of the invention, reference should be had to the appended claims.

What is claimed is:

1. An indicator circuit for controlling the position of an indicator armature comprising first and second coils, energizing means connected to the first and second coils to produce first and second constant and equal magnetic fields along first and second magnetic axes, the first and second magnetic axes intersecting at a predetermined angle, third and fourth coils, variable energizing means connected to the third and fourth coils to produce third and fourth magnetic fields along the first and second magnetic axes opposite in direction to the first and second magnetic fields respectively, the variable energizing means including a voltage source and first and second inter-dependently variable resistors connected in series with the third and fourth coils, a slidable contact attached to the first and second resistors for inter-dependently varying the portion of the resistors connected in series with the third and fourth coils, the slidable contact being positionable to vary the respective portions of the first and second resistors between predetermined maximum and minimum values, the minimum values of the first and second resistors respectively occurring at different positions of the slidable contact, and a magnetic armature rotatably mounted in magnetic proximity to the coils and responsive to the magnetic fields to be aligned with the resultant thereof.

2. In an electrical indicator, first and second windings for producing magnetic fields according to respective fluxes generated thereby, the first winding comprising first reference and control coils coaxially wound so as to produce respective fluxes in opposite directions along the magnetic axis thereof, the second winding comprising second reference and control coils coaxially wound so as to produce respective fluxes in opposite directions along the magnetic axis thereof, the magnetic axes of the first and second windings intersecting at a predetermined angle, a source of energizing voltage, one terminal of the source being connected to a point of reference potential and the other terminal being connected to one side of all of the first and second coils, the other side of the first and second reference coils being connected to the point of reference potential thereby producing respective reference fluxes having constant values, the other side of the first and second control coils being connected to points of inter-dependently varying potential whereby the first and second control coils produce respective inter-dependently varying control fluxes which range from values less than to values greater than the respective reference fluxes, a permanent magnet rotatably supported within the magnetic influence of the first and second windings and adapted to be disposed in a predetermined position with respect to the resultant magnetic field produced thereby.

3. In an electric gauge for indicating the position of a remote element, the combination of first and second coils disposed in mutual proximity with the magnetic axes thereof intersecting at a predetermined angle, a source of energizing potential, first and second inter-dependently variable resistors, one end of the first and second coils being connected to one terminal of the source, the other ends of the first and second coils being individually connected through the first and second resistors to the other terminal of the source to produce first and second interdependently variable magnetic fields in first and second directions respectively, third and fourth coils connected across the source and coaxially disposed with respect to the first and second coils respectively to produce third and fourth magnetic fields opposite in direction to the first and second directions, displaceable means to vary the first and second resistors according to first and second desired functions of displacement, the first and second functions each having a minimum resistance value, the respective minimums occurring at predetermined first and second displacements of the displaceable means.

4. An electrical gauge for indicating a remote condition comprising the combination of a transmitter, a receiver, and a source of energizing voltage, the transmitter comprising first and second resistive elements of effectively equal length and resistance, a slidable contact connected to a point of reference potential and slidably contacting both the first and second resistive elements, the receiver comprising first and second control coils disposed in mutual proximity with the magnetic axes thereof intersecting at a predetermined angle, first and second reference coils wound coaxially with the first and second control coils respectively, the resistance of the reference coils being greater than that of the control coils by a predetermined amount, one terminal of the source being connected to the point of reference potential and the other terminal being connected to one end of the reference and control coils, the other end of the reference coils being connected to the point of reference potential whereby constant magnetic fields exist in first and second directions along the magnetic axes of the first and second reference coils respectively, the other end of the control coils being respectively connected to first and second predetermined points along the first and second resistors whereby variable magnetic fields exist along the magnetic axes of the first and second control coils in directions opposite to the first and second directions respectively, the predetermined points being spaced such that the respective resistances connected between the other ends of the control coils and the slidable contact vary in opposite senses over a predetermined portion of the resistors, and a permanent magnet armature rotatably mounted within the magnetic influence of the coils whereby the armature tends to align with the poles thereof in a predetermined disposition with respect to the resultant magnetic field.

5. The combination as defined by claim 4 wherein the first and second predetermined points are positioned along the first and second resistors such that there exist two positions of the slidable contact on opposite sides of the respective predetermined points where the resistance connected between the other ends of the control coils and the slidable contact is equal to the predetermined amount, one of the positions on each of the first and second resistors corresponding to the predetermined point on the other resistor, whereby the armature is rotated through a predetermined angle as the position of the slidable contact is progressed along the first and second resistors in one direction.

6. The combination as defined by claim 4 wherein the predetermined angle is substantially 90°.

7. An indicator circuit for angularly displacing a magnetic armature in response to changing conditions at a remote point including means for producing first and second constant magnetic fields along first and second magnetic axes, the first and second magnetic axes intersecting at a predetermined angle, first and second coils for producing first and second variable magnetic fields along the first and second magnetic axes opposite in direction to the first and second constant magnetic fields respectively, a source of direct voltage having one terminal connected to one end of each of the first and second coils, sending means for varying the first and second variable magnetic fields between values greater and smaller than the constant magnetic fields including first and second resistance elements, the other ends of the first and second coils being connected to intermediate points on the first and second resistance elements respectively, displaceable contact means mutually connecting the resistance elements and connected to the other terminal of the source, the intermediate points being located to be contacted at separate positions of the displaceable contact means, and a magnetic armature rotatably mounted with respect to the constant and variable magnetic fields to be aligned with the vectorial resultant thereof.

References Cited in the file of this patent

UNITED STATES PATENTS

| | | |
|---|---|---|
| 1,713,850 | McCou | May 25, 1929 |
| 2,225,032 | Carbonava | Dec. 17, 1940 |
| 2,393,197 | Scott | Jan. 15, 1946 |
| 2,599,756 | Geiser | June 10, 1952 |
| 2,994,026 | Sampietro | July 25, 1961 |